US011872802B2

(12) United States Patent
Gong et al.

(10) Patent No.: US 11,872,802 B2
(45) Date of Patent: Jan. 16, 2024

(54) PATTERN TRANSFER APPARATUS AND PATTERN TRANSFER METHOD

(71) Applicants: BOE MLED TECHNOLOGY CO., LTD., Beijing (CN); BOE TECHNOLOGY GROUP CO., LTD., Beijing (CN)

(72) Inventors: Linhui Gong, Beijing (CN); Chao Liu, Beijing (CN); Qiangwei Cui, Beijing (CN); Ke Meng, Beijing (CN); Haiwei Sun, Beijing (CN)

(73) Assignees: BOE MLED TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 169 days.

(21) Appl. No.: 17/310,292

(22) PCT Filed: Jan. 12, 2021

(86) PCT No.: PCT/CN2021/071181
§ 371 (c)(1),
(2) Date: Jul. 27, 2021

(87) PCT Pub. No.: WO2021/155736
PCT Pub. Date: Aug. 12, 2021

(65) Prior Publication Data
US 2022/0314598 A1 Oct. 6, 2022

(30) Foreign Application Priority Data
Feb. 6, 2020 (CN) ........................ 202010082053.8

(51) Int. Cl.
*B41F 16/00* (2006.01)

(52) U.S. Cl.
CPC .................................... *B41F 16/00* (2013.01)

(58) Field of Classification Search
CPC ............................... B41F 16/00; B41F 17/003
See application file for complete search history.

(56) References Cited

U.S. PATENT DOCUMENTS

2004/0099159 A1* 5/2004 Volder .................... B41F 17/36 101/35
2004/0134596 A1* 7/2004 Rosati ..................... B41F 17/00 156/230
2007/0008597 A1* 1/2007 Watanabe ................ G03H 1/02 359/9

(Continued)

FOREIGN PATENT DOCUMENTS

CN 107253394 A 10/2017
CN 207535477 U 6/2018

(Continued)

OTHER PUBLICATIONS

First Chinese Office Action dated Dec. 1, 2021, received for corresponding Chinese Application No. 202010082053.8, pp. 31.

*Primary Examiner* — David H Banh
(74) *Attorney, Agent, or Firm* — Kinney & Lange, P.A.

(57) ABSTRACT

Disclosed are a pattern transfer apparatus and a pattern transfer method. The pattern transfer method includes: transferring a pattern to a flexible printing substrate; and transferring the pattern on the printing substrate to a bending surface of a rigid carrier through an elastic rubber head.

18 Claims, 8 Drawing Sheets

(56) References Cited

U.S. PATENT DOCUMENTS

| | | | | |
|---|---|---|---|---|
| 2008/0317487 | A1* | 12/2008 | Murakami | G03G 7/006<br>399/45 |
| 2012/0018994 | A1* | 1/2012 | Stalker | B42D 15/025<br>283/100 |
| 2016/0126375 | A1* | 5/2016 | Morikawa | H01L 31/1804<br>136/244 |
| 2016/0311243 | A1* | 10/2016 | Sakamoto | B41M 1/06 |
| 2018/0218856 | A1* | 8/2018 | Ito | H01H 13/023 |
| 2020/0017328 | A1* | 1/2020 | Miyoshi | B41F 33/14 |
| 2021/0237184 | A1* | 8/2021 | Zenou | B05D 3/06 |

FOREIGN PATENT DOCUMENTS

| | | | |
|---|---|---|---|
| CN | 108656715 | A | 10/2018 |
| CN | 109094184 | A | 12/2018 |
| CN | 110356104 | A | 10/2019 |
| JP | S5941292 | A | 3/1984 |
| JP | H05338114 | A | 12/1993 |
| JP | 2005178897 | A | 7/2005 |
| JP | 5295005 | B2 | 6/2013 |
| JP | 2016150536 | A | 8/2016 |
| WO | 2016075446 | A1 | 5/2016 |

* cited by examiner

PATTERN TRANSFER APPARATUS AND PATTERN TRANSFER METHOD

CROSS-REFERENCE TO RELATED APPLICATION

This application is a Section 371 National Stage Application of International Application No. PCT/CN2021/071181, filed on Jan. 12, 2021, entitled "PATTERN TRANSFER APPARATUS AND PATTERN TRANSFER METHOD", which in turn claims priority to Chinese Application No. 202010082053.8, filed on Feb. 6, 2020, both of which are incorporated herein by reference in their entirety.

TECHNICAL FIELD

The present disclosure relates to a field of pattern transfer technology, and in particular to a pattern transfer apparatus and a pattern transfer method.

BACKGROUND

At present, applications of printing electronic elements in electrical, semiconductor and other industrial fields is gradually increasing. Gravure offset printing technology is widely used in printing electronic elements on flat surfaces, which has advantages of stable printing, simple process, and high-resolution and high-precision patterns may be obtained. However, the gravure offset printing technology may not be directly applied to printing electronic components on bending surfaces.

SUMMARY

Some embodiments of the present disclosure provide a pattern transfer method, including: transferring a pattern to a flexible printing substrate; and transferring the pattern on the printing substrate to a bending surface of a rigid carrier through an elastic rubber head.

In some embodiments, in response to transferring the pattern on the printing substrate to the bending surface of the rigid carrier, the elastic rubber head presses the printing substrate, so that a side of the printing substrate carrying the pattern is attached to the bending surface of the carrier, and a shape of the printing substrate conforms to the bending surface of the carrier.

In some embodiments, the carrier is a rigid substrate, the bending surface comprises a first edge area of a first surface facing the printing substrate and a side surface adjacent to the first edge area, in response to the rigid substrate is located at a position to be transferred.

In some embodiments, the bending surface further includes a second edge area of a second surface, the second surface is opposite to the first surface, and the second edge area is adjacent to the side surface.

In some embodiments, the printing substrate includes a plastic base layer, an adhesive layer and a pad printing adhesive layer that are sequentially stacked, and the pad printing adhesive layer is configured to carry the pattern transferred on the printing substrate.

In some embodiments, the method further including: polishing at least one of an abutment between the first edge area and the side surface and an abutment between the second edge area and the side surface, so as to achieve a smooth transition.

In some embodiments, the pattern is a conductive pattern, and a material of the pattern is a conductive silver paste ink.

In some embodiments, the printing substrate is continuous, before transferring the pattern to the flexible printing substrate, the printing substrate is released by a release roller, after transferring the pattern on the printing substrate to the bending surface of the rigid carrier, the printing substrate is recovered and wound on a recovery roller.

In some embodiments, the transferring a pattern to a flexible printing substrate includes: transferring the pattern to the flexible printing substrate through gravure printing.

In some embodiments, the transferring the pattern to the flexible printing substrate through gravure printing includes: obtaining a material of the pattern through a plate cylinder and forming the pattern on the plate cylinder; transferring the pattern on the plate cylinder to a blanket on an offset cylinder roller-to-roller; and transferring the pattern on the blanket to the printing substrate moving between the offset cylinder and an impression cylinder through roller-to-roller rotation of the offset cylinder and the impression cylinder.

In some embodiments, before transferring the pattern on the printing substrate to the bending surface of the rigid carrier through the elastic rubber head, the method further includes: transferring the printing substrate carrying the pattern and the carrier to a pattern transfer area, respectively; and positioning and aligning the printing substrate and the carrier.

In some embodiments, after transferring the pattern on the printing substrate to the bending surface of the rigid carrier through the elastic rubber head, the method further includes: curing the pattern carried on the carrier.

In some embodiments, the curing the pattern carried on the carrier includes: curing the pattern carried on the carrier through UV curing or laser curing.

In some embodiments, before transferring the pattern on the printing substrate to the bending surface of the rigid carrier through the elastic rubber head, the method further includes: performing surface treatment on the bending surface of the carrier.

In some embodiments, the surface treatment comprises plasma treatment, chemical grafting, or excimer vacuum ultraviolet irradiation.

Some embodiments of the present disclosure provides a pattern transfer apparatus, including: a printing device configured to transfer a pattern to a flexible printing substrate; and an elastic rubber head configured to transfer the pattern on the printing substrate to a bending surface of a rigid carrier.

In some embodiments, the elastic rubber head is configured to press the printing substrate, so that a side of the printing substrate carrying the pattern is attached to the bending surface of the carrier, and a shape of the printing substrate conforms to the bending surface of the carrier.

In some embodiments, the printing device includes a gravure printing device.

In some embodiments, the apparatus further includes: a release roller configured to release the printing substrate for receiving the pattern; and a recovery roller configured to recover the printing substrate that completes an operation of transferring the pattern to the carrier.

BRIEF DESCRIPTION OF THE DRAWINGS

In order to explain technical solutions of the embodiments of the present disclosure more clearly, drawings of the embodiments will be briefly described below. It should be understood that the drawings described below only relate to some embodiments of the present disclosure, rather than limiting the present disclosure, wherein.

DETAILED DESCRIPTION OF EMBODIMENTS

Figure 1:
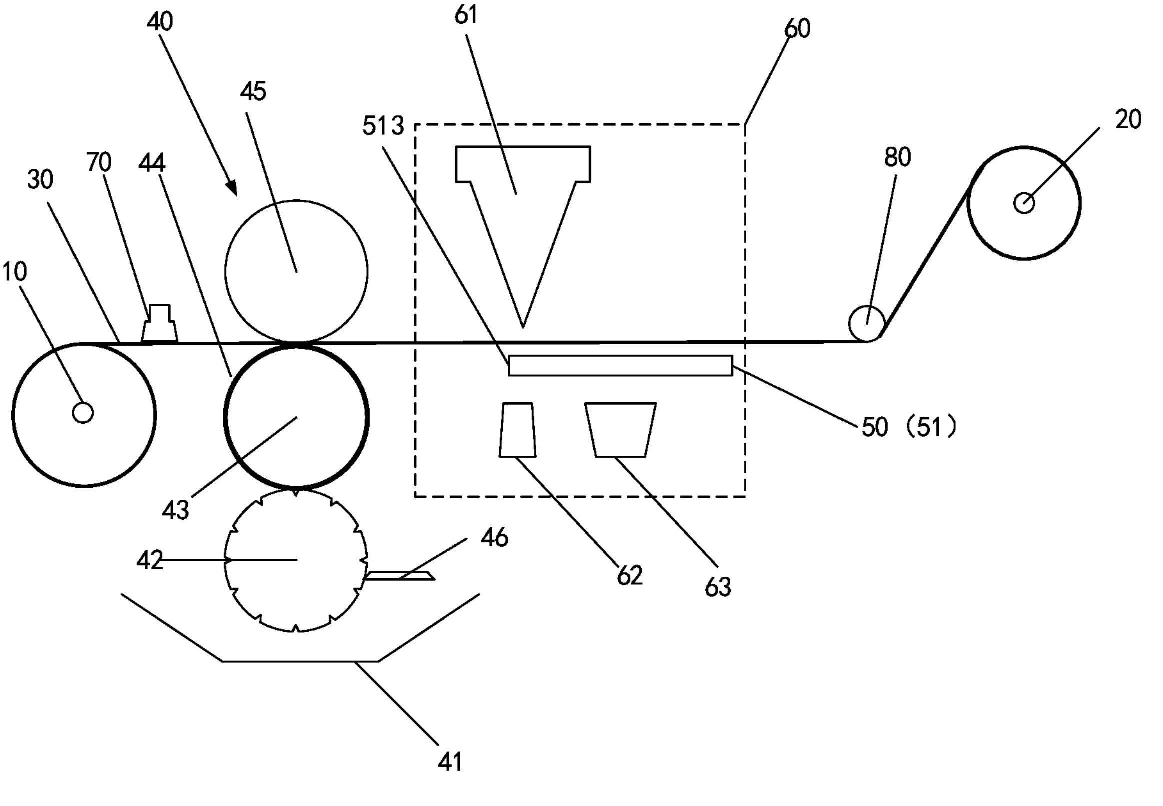
FIG. 1 is a schematic structural diagram of a pattern transfer apparatus according to some embodiments of the present disclosure.

In order to more clearly illustrate the objectives, technical solutions, and advantages of the present disclosure, the embodiments of the present disclosure will be described in detail below with reference to the drawings. It should be understood that the following description of the embodiments is intended to explain and illustrate the general idea of the present disclosure, and should not be construed as limiting the present disclosure. In the specification and the drawings, the same or similar reference signs indicate the same or similar components or members. For clarity, the drawings are not necessarily drawn to scale, and some well-known components and structures may be omitted from the drawings.

Unless otherwise defined, the technical terms or scientific terms used in the present disclosure shall have the usual meanings understood by those skilled in the art. The “first”, “second” and similar words used in the present disclosure do not indicate any order, quantity or importance, but are only used to distinguish different components. The term “a” or “an” does not exclude a plurality. “Include” or “comprise” and other similar words indicate that an element or an item appearing before the term covers the element or the item listed after the term, and their equivalents, but does not exclude other elements or items. “Connected” or “adjacent” and similar words are not limited to physical or mechanical connections, but may include electrical connections, whether direct or indirect. “Up”, “down”, “left”, “right”, “top” or “bottom” are only used to indicate a relative position relationship. When an absolute position of the described object changes, the relative position relationship may also be changed accordingly. When an element such as a layer, film, region, or base substrate is indicated as being “on” or “under” another element, the element may be “directly” on or “under” the another element, or there may be intermediate elements.

At present, the requirements for printing electronic components are increasing continuously, which is not only limited to printing voltage components on flat surfaces, but there is an increasing need to print voltage components on bending surfaces. For example, the current display devices are developing towards ultra-thin, ultra-narrow bezels or bezelless. By forming electrodes and/or wirings on a side surface of a glass substrate, an ultra-narrow bezel or even a bezelless design of a display device may be achieved. Therefore, it is an urgent problem to be solved that how to print electrodes and/or wirings on the bending surface including the side surface of the glass substrate, for example, how to transfer electrodes and/or wirings on a side of a Micro LED panel. The above-mentioned bending surface also includes a partial area of a first surface (for example, a display surface) adjacent to the side surface of the glass substrate and a partial area of a second surface adjacent to the side surface of the glass substrate. The first surface is adjacent to the side surface of the glass substrate and the first surface is provided with electronic elements such as switching elements, electrodes, etc. The second surface is opposite to the first surface.

In the related art, conventional techniques for transferring a pattern to a bending surface mainly include pad printing process, optically clear adhesive (OCA) composite printing process, and laser engraving printing process. The pad printing process uses a pad printing rubber head to carry the pattern to be printed, and the pad printing process directly transfers the pattern on the pad printing rubber head to the bending surface. However, due to a large deformation of the pad printing rubber head made of rubber, the printing accuracy is difficult to control. If the bending surface has a large bending angle, it is easy to break wirings; the OCA composite printing process requires the use of masks, etc., which is complicated in process and high in cost, and it is easy to produce defects such as bubbles when the curvature of the bending surface is large; the laser engraving printing process has special requirements for the use of material, and the cost is relatively high.

The present disclosure provides a pattern transfer method, including: transferring a pattern to a flexible printing substrate; and transferring the pattern on the printing substrate to a bending surface of a rigid carrier through an elastic rubber head. In this way, it is possible to combine a mature gravure printing process to expand the carrier for pattern transfer from flat surface to bending surface, even the aforementioned bending surface including the side surface of the glass substrate. The pattern transfer method solves problems of electrode and/or wiring breakage, pad printing slippage, positioning and low efficiency, etc. caused by the pad printing process on the side of the glass substrate. The pattern transfer method may ensure the printing accuracy of the pattern printed on the bending surface, and there are few restrictions on the use of the material, which may meet the use of most products while enabling continuous production, which reduces process costs and improves production efficiency.

In the context of the present disclosure, “bending surface” refers to a non-flat surface that is bent or folded. For example, the bending surface may be a curved arc-shaped surface, or the bending surface may be a surface that is folded into a plurality of sections.

FIG. 1 is a schematic structural diagram of a pattern transfer apparatus according to some embodiments of the present disclosure, FIG. 1 illustrates a pattern transfer apparatus for printing a pattern on a bending surface. As shown in FIG. 1, the pattern transfer apparatus 100 includes a release roller 10, a recovery roller 20, a flexible printing substrate 30, a gravure printing device 40 and an elastic rubber head 61. The flexible printing substrate 30 is wound around the release roller 10 to form a printing substrate roll. As the release roller 10 rotates, the printing substrate 30 is released from the printing substrate roll. The printing substrate 30 passes through the gravure printing device 40, and the gravure printing device 40 transfers a pattern to the printing substrate 30. Then, the printing substrate 30 is transported to a pattern transfer area 60. In the pattern transfer area 60, the elastic rubber head 61 is used to transfer the pattern on the printing substrate 30 to a bending surface of a rigid carrier 50 (for example, a rigid substrate, specifically, for example, a glass substrate). Subsequently, the printing substrate 30 is separated from the carrier 50 and the printing substrate 30 is recovered by the recovery roller 20. Since a continuous printing substrate 30 may be continuously transported from the release roller 10 to the recovery roller 20, the pattern transfer apparatus may be used to achieve continuous pattern transfer, which reduces process cost and improves production efficiency.

Specifically, as shown in FIG. 1, the gravure printing device 40 includes a container 41 containing a pattern material, a plate cylinder 42, an offset cylinder 43 and a blanket 44, and an impression cylinder 45 thereon. A surface of the plate cylinder 42 includes grooves corresponding to a shape of the pattern to be transferred. The plate cylinder 42 may obtain the pattern material from the container 41 in which the pattern material is contained. For example, the pattern material is ink, and more specifically, the pattern material is conductive silver paste ink. The ink is filled into the grooves to form the pattern.

In some embodiments, the plate cylinder 42 may use laser engraving, wet etching or reactive ion etching to form the grooves thereon, and different grooves may be customized according to requirements.

In some embodiments, as shown in FIG. 1, the gravure printing device 40 also includes a scraper 46. The scraper 46 is configured to scrape remaining ink liquids in other positions of the plate cylinder 42 except for the grooves, so as to avoid remaining ink liquids from affecting the transferred pattern. The scraper needs to have wear resistance and high efficiency, and the scraper may be made of metal texture such as stainless steel. A scraping angle of the scraper is 40° to 60°, which may basically ensure that there is no remaining liquid in other positions of the plate cylinder except for the grooves.

The plate cylinder 42 and the offset cylinder 43 loaded with the blanket 44 rotate roller-to-roller, as shown in FIG. 1, the plate cylinder 42 rotates counterclockwise, for example, and the offset cylinder 43 rotates clockwise, for example. An adhesion of the blanket 44 to the ink is greater than an adhesion of the plate cylinder 42 to the ink, so that the pattern on the plate cylinder 42 is transferred to the blanket 44.

The offset cylinder 43 loaded with the blanket 44 and the impression cylinder 45 rotate roller-to-roller. The offset cylinder 43 rotates clockwise, for example, and the impression cylinder 45 rotates counterclockwise, for example. The printing substrate 30 passes between the offset cylinder 43 and the impression cylinder 45 based on a rotation of the release roller 10 and the recovery roller 20. An adhesion of the printing substrate 30 to the ink is greater than an adhesion of the blanket 44 to the ink, so that the pattern on the blanket 44 is transferred to the printing substrate 30.

As the release roller 10 and the recovery roller 20 rotate, the pattern to be transferred carried by the printing substrate 30 moves to the pattern transfer area 60, while the carrier 50 is also transported to the pattern transfer area 60. In the pattern transfer area 60, for example, the carrier 50 is sucked and moved by a vacuum chuck to the pattern transfer area 60, and is fixed at a position to be transferred. The elastic rubber head 61 presses the printing substrate 30 toward the carrier 50, the pattern on the printing substrate 30 is transferred to a bending surface of the rigid carrier 50, and an adhesion of the carrier 50 to the ink is greater than an adhesion of the printing substrate 30 to the ink.

Since the elastic rubber head 61 may have a large deformation, the elastic rubber head 61 presses the printing substrate 30, so that a side of the printing substrate 30 carrying the pattern is attached to the bending surface of the carrier 50, and a shape of the printing substrate 30 conforms to the bending surface of the carrier 50. In this way, the pattern on the printing substrate 30 may be transferred to the bending surface of the rigid carrier 50, and the transfer accuracy is high.

It should be understood that in the process of transferring the pattern on the printing substrate 30 to the bending surface of the rigid carrier 50 through the elastic rubber head 61, the release roller 10 and the recovery roller 20 stop rotating, the plate cylinder 42, the offset cylinder 43 and the impression cylinder 45 of the gravure printing device 40 also stop rotating. After the pattern on the printing substrate 30 is transferred to the bending surface of the rigid carrier 50, the elastic rubber head 61 is reset, the printing substrate 30 is separated from the carrier 50 carrying the pattern, the release roller 10, the recovery roller 20 and the plate cylinder 42, the offset cylinder 43 and the impression cylinder 45 of the gravure printing device 40 resume rotating, until a pattern is transferred to a bending surface of the next carrier 50.

In some embodiments, the pattern transfer apparatus 100 further includes an alignment device 62 located in the pattern transfer area 60, such as a CCD alignment device. The alignment device 62 is used to position and align the pattern to be transferred carried on the printing substrate 30 and the carrier 50. Specifically, the alignment device 62 aligns an alignment mark on the printing substrate 30 with an alignment mark on the carrier 50, so that the pattern may be accurately transferred to the bending surface of the carrier 50, thereby avoiding misalignment of the transfer position.

In some embodiments, the pattern transfer device 100 further includes a curing device 63, such as a UV curing device, a laser curing device or the like. The curing device may be selected according to the ink. When the ink contains a photosensitive resin material, the UV curing device may be selected, When the ink contains a heat-sensitive resin material, the laser curing device may be selected.

In some embodiments, the pattern transfer device 100 further includes a smoothing brush 70 between the release roller 10 and the gravure printing device 40, the smoothing brush 70 is used to avoid wrinkles on the printing substrate 30 transmitted to the gravure printing device 40, so as to ensure flatness of the printing substrate 30 and ensure the transfer quality.

In some embodiments, the pattern transfer device 100 further includes a positioning roller 80 between the pattern transfer area 60 and the recovery roller 20. The positioning roller 80 and the printing substrate 30 after passing through the pattern transfer area 60 are basically at the same level, so that the printing substrate 30 may be recovered on the recovery roller 20 smoothly.

A pattern transfer method for transferring a pattern to a bending surface will be described in detail below in conjunction with the above-mentioned pattern transfer apparatus.

In the following embodiments of the present disclosure, the carrier 50 being a glass substrate is taken as an example for description. The glass substrate mentioned here may be a blank glass substrate or a glass substrate provided with electronic elements in a process of manufacturing a panel, which is not specifically limited here.

Figure 2:
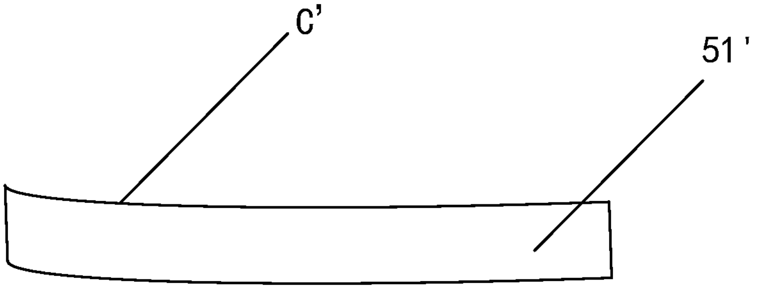
FIG. 2 is a schematic structural diagram of a glass substrate according to some embodiments of the present disclosure.
Figure 3:
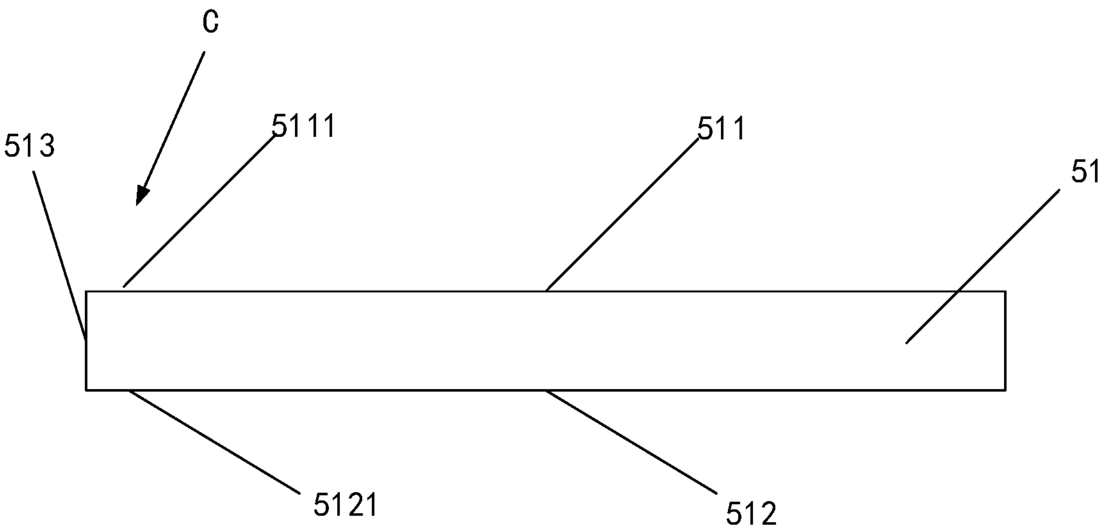
FIG. 3 is a schematic structural diagram of a glass substrate according to some embodiments of the present disclosure.

FIGS. 2 and 3 respectively schematically illustrate a structure of a glass substrate in some embodiments of the present disclosure. In some embodiments, as shown in FIG. 2, a bending surface of a glass substrate 51' may be an arc surface C'. In some embodiments, as shown in FIG. 3, a glass substrate 51 includes a first surface 511 and a second surface 512 opposite to each other and a side surface 513 adjacent to both the first surface 511 and the second surface 522, the first surface 511 and the second surface 512 are parallel to each other, and the side surface 513 is substantially perpendicular to the first surface 511 and the second surface 512. When the glass substrate 51 is moved and fixed to the position to be transferred in the pattern transfer area 60 in FIG. 1, the first surface 511 faces the printing substrate 30, the first surface 511 is, for example, a display surface provided with electronic elements (for example, switching elements, pixel electrodes, etc.). A bending surface C of the glass substrate 51 may include the side surface 513, a first edge area 5111 of the first surface 511 adjacent to the side surface 513 and a second edge area 5121 of the second surface 512 adjacent to the side surface 513.

In some varied embodiments, the first surface 511 and the second surface 512 may be non-parallel, the side surface 513 and the first surface 511 form a first angle, and the side surface 513 and the second surface 512 form a second angle.

The bending surface C of the glass substrate 51 shown in FIG. 3 is taken as an example in the following embodiment, to describe the pattern transfer method for transferring the pattern to the bending surface in detail. The pattern is a conductive pattern, such as an electrode, a wiring and the like.

Figure 4:
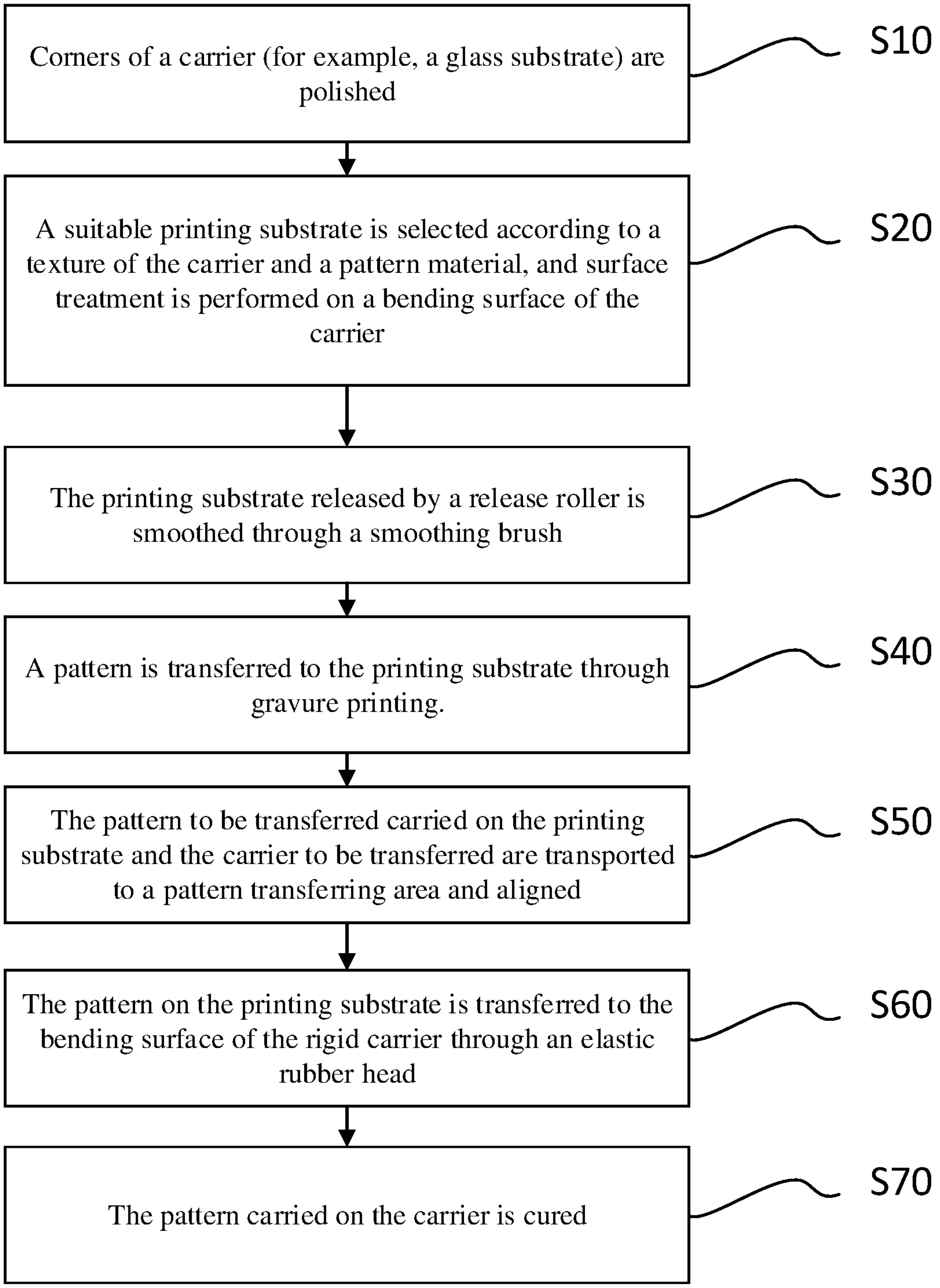
FIG. 4 is a flowchart of a pattern transfer method according to some embodiments of the present disclosure.

FIG. 4 illustrates a flowchart of a pattern transfer method according to some embodiments of the present disclosure. As shown in FIG. 4, the pattern transfer method includes the following steps:

Step S10: corners of a carrier (for example, a glass substrate) are polished.

In the embodiment, the bending surface C of the glass substrate 51 to carry the pattern is shown in FIG. 3, including the side surface 513, the first edge area 5111 of the first surface 511 adjacent to the side surface 513 and the second edge area 5121 of the second surface 512 adjacent to the side surface 513. An abutment between the side surface 513 and the first edge area 5111 has a corner, and an abutment between the side surface 513 and the second edge area 5121 has a corner. Stress concentration at the corners may easily cause the pattern after printing, for example, electrodes and/or wirings to be broken.

Figure 5A:
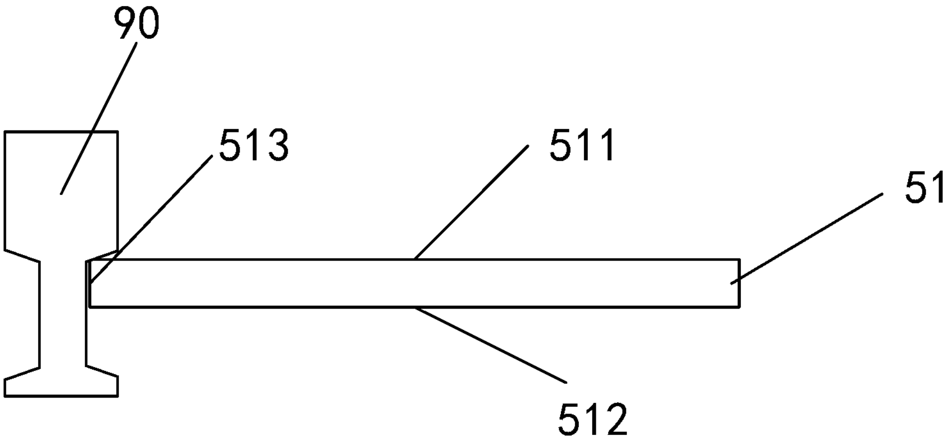
FIGS. 5*a* and 5*b* are schematic diagrams of polishing a corner of a glass substrate according to some embodiments of the present disclosure.
Figure 5B:
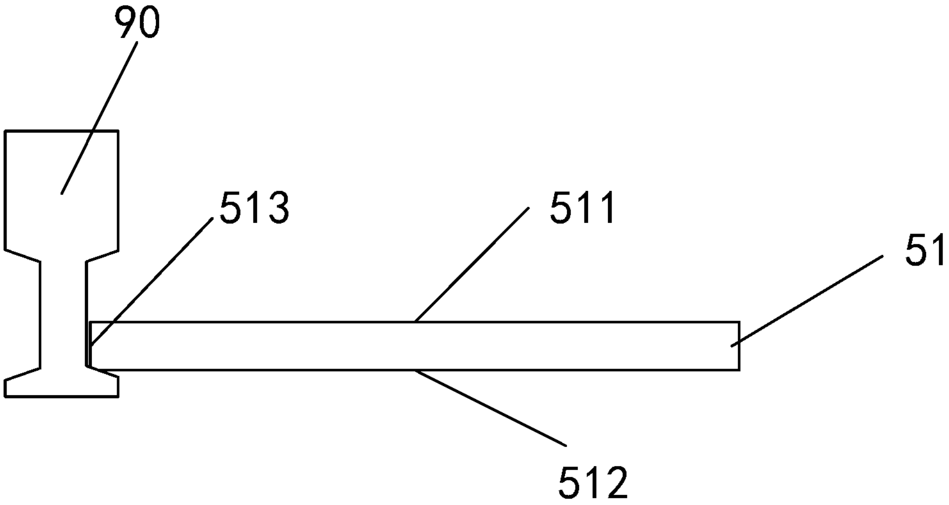

FIGS. 5*a* and 5*b* illustrate schematic diagrams of polishing corners of a glass substrate. In this step, a polishing tool 90 is used to polish the abutment between the side surface 513 and the first edge area 5111 of the glass substrate 51 and the abutment between the side surface 513 and the second edge area 5121, respectively. That is, the corners of the glass substrate 51 are chamfered, so that the side surface 513 and the first edge area 5111 are smoothly transitioned, and the side surface 513 and the second edge area 5121 are smoothly transitioned. Specifically, FIG. 5*a* illustrates that the polishing tool 90 is used to polish the abutment between the side surface 513 and the first edge area 5111 of the glass substrate 51. FIG. 5*b* illustrates that the polishing tool 90 is used to polish the abutment between the side surface 513 and the second edge area 5121 of the glass substrate 51.

Those skilled in the art may understand that when the pattern is transferred to the smooth bending surface (the bending surface C' of the glass substrate 51' as shown in FIG. 2), step S10 may be omitted.

Step S20: a suitable printing substrate is selected according to a texture of the carrier and a pattern material, and surface treatment is performed on a bending surface of the carrier.

In the embodiment, it is necessary to print an electrode pattern on the bending surface C of the glass substrate 51 as shown in FIG. 3, Therefore, conductive silver paste ink is used as the pattern material (viscosity is about 13000 cps, for example) while a suitable printing substrate 30 needs to be selected, so that an adhesion of the printing substrate 30 to the conductive silver paste ink is greater than an adhesion of the blanket 44 to the conductive silver paste ink and is smaller than an adhesion of the glass substrate 51 to the conductive silver paste ink.

Figure 6:
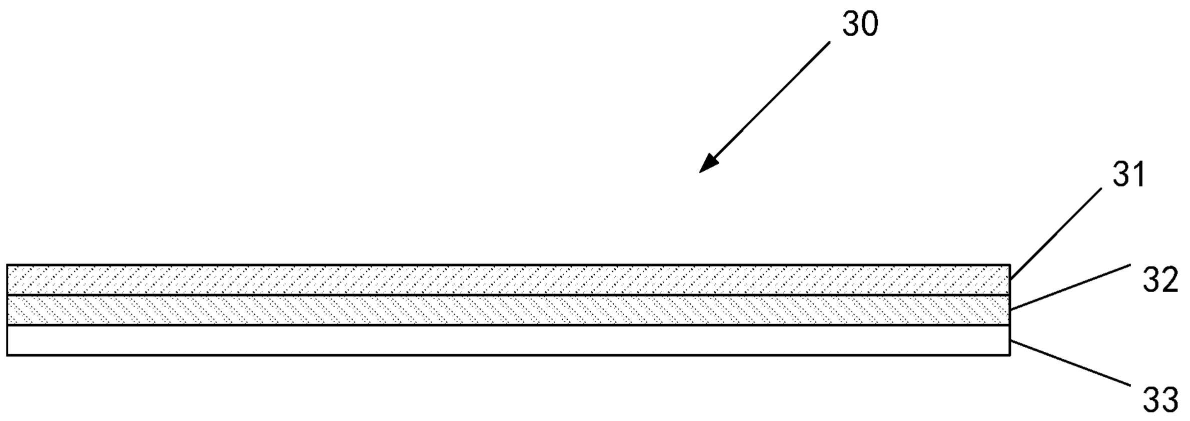
FIG. 6 is a schematic diagram of a cross-sectional structure of a printing substrate according to some embodiments of the present disclosure.

Specifically, FIG. 6 is a schematic structural diagram of a printing substrate 30 in the embodiment, as shown in FIG. 6, the printing substrate 30 includes a plastic base layer 31, an adhesive layer 32 and a pad printing adhesive layer 33 that sequentially stacked. The pad printing adhesive layer 33 may be made of a rubber material such as rubber coating. The rubber material may meet the above adhesion relationship. However, the rubber material may not be made into a micron-level film, the rubber material is generally made of a rubber sheet, which is not flexible enough and is not conducive to transfer the pattern. Therefore, the printing substrate 30 needs to be designed as a stacked structure as shown in FIG. 6. A thickness of the plastic base layer 31 (for example, PET material) is 20 to 100 μm, a thickness of the pad printing adhesive layer 33 is, for example, 10 to 100 μm. Generally, surface energy of a plastic material is low, and an adhesion of the pad printing adhesive layer 33 to the plastic base layer 31 is poor. Therefore, the adhesive layer 32 is disposed between the pad printing adhesive layer 33 and the plastic base layer 31, and the adhesive layer 32 is, for example, a graft copolymer or the like. In the embodiment, the pattern is transferred to the pad printing adhesive layer 33 of the printing substrate 30, and a side of the pad printing adhesive layer 33 away from the adhesive layer 32 is smooth, so that the printing substrate 30 may have better flatness, which is convenient for the pattern to be transferred to the printing substrate 30.

In order to further improve the adhesion of the glass substrate 51 to the conductive silver paste ink, it is also possible to perform surface treatment on the bending surface C of the glass substrate 51, such as plasma treatment, chemical grafting or excimer vacuum ultraviolet irradiation. In the embodiment, plasma may be used to perform surface treatment on the glass substrate 51, a contact angle of the bending surface C of the processed glass substrate 51 to the conductive silver paste ink may be less than 10 degrees. In this way, the adhesion of the glass substrate 51 to the conductive silver paste ink is further improved, and the problem of incomplete transfer when the pattern is transferred from the printing substrate 30 to the bending surface C of the glass substrate 51 is avoided.

In some other embodiments, similar surface treatments may also be performed on the printing substrate 30, and a transfer effect when the pattern is transferred from the blanket 44 to the printing substrate 30 is improved.

In other embodiments, when other materials are used for the carrier, the printing substrate 30 may be selected according to actual needs. For example, PET, PP, PA and other film materials may be selected.

Step S30: the printing substrate released by a release roller is smoothed through a smoothing brush.

With reference to FIG. 1, the smoothing brush 70 is disposed between the release roller 10 and the gravure printing device 40, and is used to smooth the printing substrate 30 released by the release roller 10, so as to ensure the flatness of the printing substrate 30 entering the gravure printing device 40 and avoid the occurrence of wrinkles, and thus the quality of the pattern transferred to the printing substrate 30 may be improved.

Those skilled in the art may understand that, in some embodiments, the printing substrate 30 has good flatness after being released by the release roller 10 due to factors such as material, and this step may be omitted in this case.

Step S40: a pattern is transferred to the printing substrate through gravure printing.

With reference to FIG. 1, according to the texture, thickness and pattern material (for example, conductive silver paste ink) of the printing substrate 30 (for example, the aforementioned stacked structure), a pressure between the plate cylinder 42 and the offset cylinder 43 and a pressure between the offset cylinder 43 and the impression cylinder 45 of the gravure printing device 40 are adjusted, rotational speeds of the above three cylinders of the gravure printing device 40 and a transmission speed of the printing substrate 30 are adjusted and matched, so that the pattern may be transferred to the printing substrate 30 efficiently and accurately. As shown in FIG. 1, a lower surface of the printing substrate 30 is the pad printing adhesive layer 33, as the release 10 and the recovery roller 20 rotate, the printing substrate 30 is transmitted between the offset cylinder 43 and the impression cylinder 45, and the pattern is transferred to the pad printing adhesive layer 33 of the printing substrate 30.

In the embodiment, the adhesion of the blanket 44 on the offset cylinder 43 to the conductive silver paste ink is greater than the adhesion of the impression cylinder 45 to the conductive silver paste ink, and the adhesion of the pad printing adhesive layer 33 in the printing substrate 30 to the conductive silver paste ink is greater than the adhesion of the blanket 44 to the conductive silver paste ink. In the present disclosure, an adhesion of a surface of object to the conductive silver paste ink is related to a contact angle of the conductive silver paste ink on the surface of object. Smaller the contact angle, greater the adhesion of the surface of object to the conductive silver paste ink.

Transferring the pattern to the printing substrate 30 through gravure printing may ensure the accuracy of the transfer pattern, that is, a precise pattern may be transferred, such as a pattern with line width of micrometers.

Step S50: the pattern to be transferred carried on the printing substrate and the carrier to be transferred are transported to the pattern transfer area and aligned.

Specifically, with reference to FIG. 1, as the release roller 10 and the recovery roller 20 rotate, the pattern to be transferred carried on the printing substrate 30 is transported to the pattern transfer area 60 for positioning, and the glass substrate 51 is also transported to the pattern transfer area 60. The glass substrate 51 may be sucked and moved by a vacuum chuck to a position to be transferred in the pattern transfer area 60. The alignment device 62, such as a CCD alignment device, is used to align the pattern to be transferred on the printing substrate 30 and the glass substrate 51. Specifically, an alignment mark on the printing substrate 30 is aligned with an alignment mark on the glass substrate 51, so that the pattern may be accurately transferred to the bending surface C of the glass substrate 51.

Those skilled in the art may understand that, after the pattern to be transferred carried on the printing substrate 30 is transferred to the pattern transfer area 60 for positioning, the release roller 10, the recovery roller 20 and the rollers of the gravure printing device 40 all stop rotating, that is, the printing substrate 30 stops transmitting, so as to facilitate subsequent alignment of the pattern to be transferred carried on the printing substrate 30 and the glass substrate 51 and subsequent pattern transfer.

Step S60: the pattern on the printing substrate is transferred to the bending surface of the rigid carrier through an elastic rubber head.

Figure 7A:
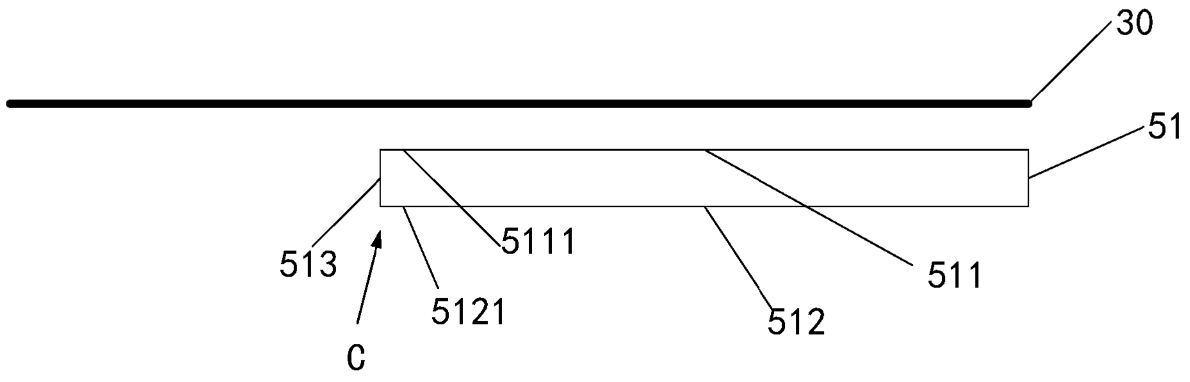
FIGS. 7*a*, 7*b*, 7*c*, and 7*d* are schematic diagrams of a process of transferring a pattern on a printing substrate to a bending surface of a glass substrate through an elastic rubber head according to some embodiments of the present disclosure.
Figure 7B:
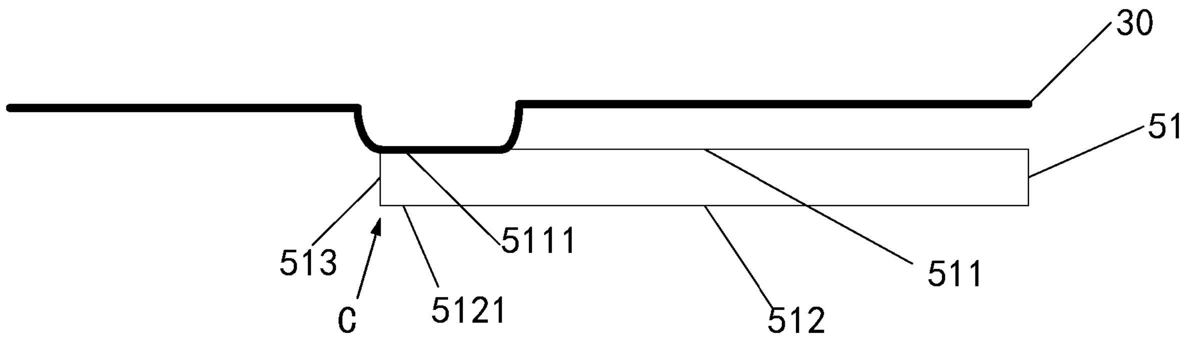
Figure 7C:
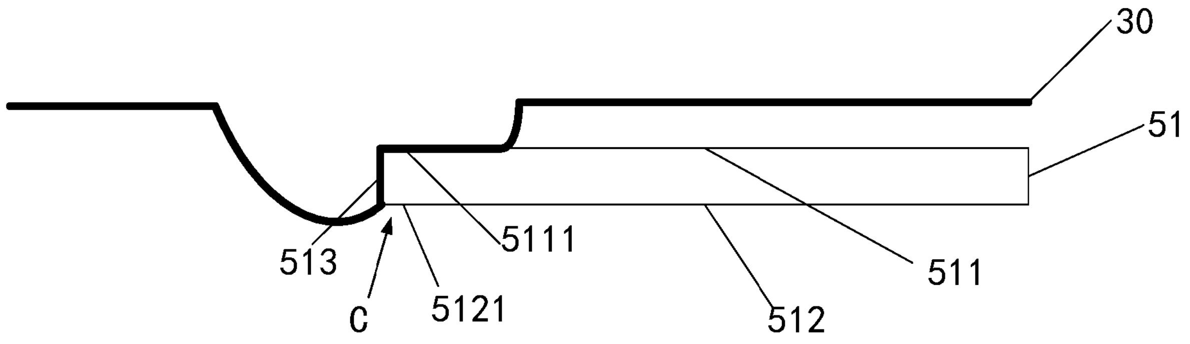
Figure 7D:
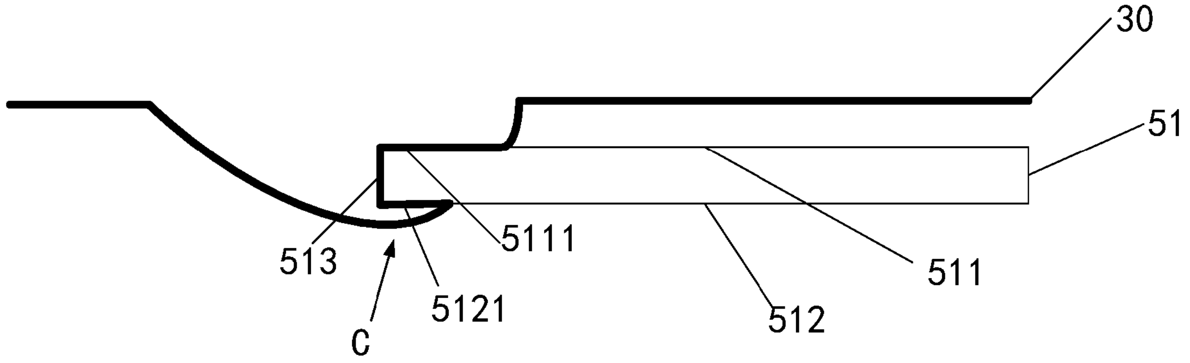

Specifically, FIGS. 7*a*-7*d* are schematic diagrams of a process of transferring a pattern on a printing substrate to a bending surface of a glass substrate through an elastic rubber head. In the embodiment, the bending surface C of the glass substrate 51 includes the side surface 513, the first edge area 5111 of the first surface 511 adjacent to the side surface 513 and the second edge area 5121 of the second surface 512 adjacent to the side surface 513 as shown in FIG. 3. As shown in FIG. 7*a*, the glass substrate 51 is at the position to be transferred, the glass substrate 51 and the printing substrate 30 are disposed in parallel, for example, both the glass substrate 51 and a printing substrate 30 are disposed horizontally. The aligned printing substrate 30 and the glass substrate 51 are separated by a predetermined distance. The first surface 511 of the glass substrate 51 is disposed facing the pad printing adhesive layer 33 of the printing substrate 30, with reference to FIG. 1, the elastic rubber head 61 is located just above the first edge area 5111 of the first surface 511 and the elastic rubber head 61 is located on a side of the printing substrate 30 away from the first surface 511. As the elastic rubber head 61 is pressed down in a direction perpendicular to the first surface 511 (for example, vertical direction), the printing substrate 30 carrying the pattern is in contact with the first edge area 5111 of the first surface 511 under the pressure of the elastic rubber head 61, as shown in FIG. 7*b*. As the elastic rubber head 61 is further pressed down in the direction perpendicular to the first surface 511 (for example, vertical direction), the elastic rubber head 61 is deformed greatly, the printing substrate 30 carrying the pattern is in further contact with the side surface 513 under the pressure of the elastic rubber head 61, while the printing substrate 30 carrying the pattern covers the first edge area 5111 of the first surface 511 and the side surface 513, as shown in FIG. 7*c*. The elastic rubber head 61 may be further pressed down in the direction perpendicular to the first surface 511 (for example, vertical direction), while the elastic rubber head 61 undergoes greater deformation, the printing substrate 30 carrying the pattern is in further contact with the second edge area 5121 of the second surface 512 of the glass substrate 51 under the pressure of the elastic rubber head 61, while the printing substrate 30 carrying the pattern covers the first edge area 5111 of the first surface 511, the side surface 513 and the second edge area 5121 of the second surface 512, as shown in FIG. 7*d*. In this way, the pattern is transferred to the first edge area 5111 of the first surface 511, the side surface 513 and the second edge area 5121 of the second surface 512 of the glass substrate 51. Subsequently, the elastic rubber head 61 moves upward in the direction perpendicular to the first surface 511 to return to its initial position, while the printing substrate 30 is separated from the glass substrate carrying the pattern under action of elasticity, and one time of the process of transferring the pattern to the bending surface of the glass substrate 51 is completed.

In the above embodiment, the pattern is transferred to the first edge area 5111 of the first surface 511, the side surface 513 and the second edge area 5121 of the second surface 512 of the glass substrate 51. In some other embodiments, the pattern only needs to be transferred to the first edge area 5111 and the side surface 513 of the first surface 511 of the glass substrate 51, while the bending surface of the glass substrate 51 only includes the first edge area 5111 of the first surface 511 and the side surface 513. The elastic rubber head 61 is pressed down so that the printing substrate 30 carrying the pattern covers the first edge area 5111 of the first surface 511 and the side surface 513 to complete the pattern transfer, while the elastic rubber head 61 does not need to be further pressed down, and the elastic rubber head 61 directly moves upward in the direction perpendicular to the first surface 511 to return to the initial position.

Figure 8:
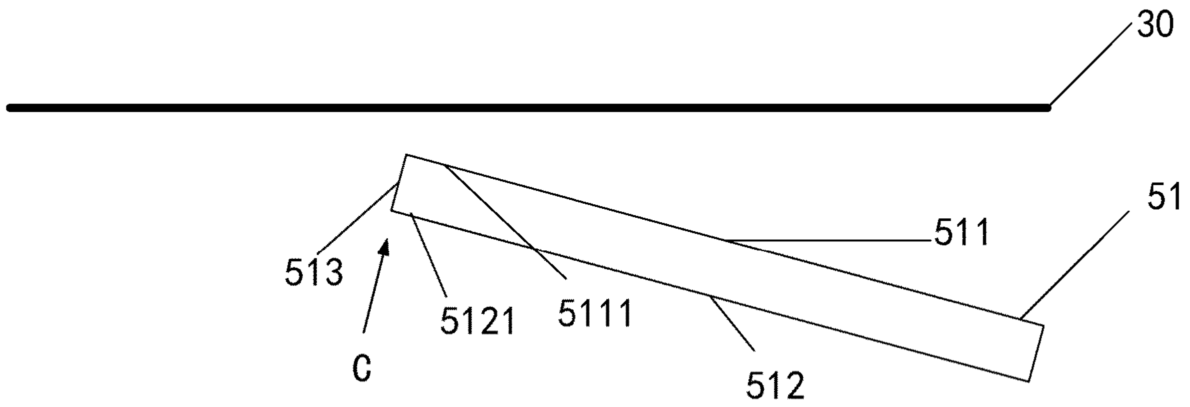
FIG. 8 is a schematic diagram of a glass substrate located at a position to be transferred according to some embodiments of the present disclosure.

In the above embodiment, as shown in FIG. 7*d*, as the elastic rubber head 61 is further pressed down in the vertical direction, the printing substrate 30 carrying the pattern covers the first edge area 5111 of the first surface 511, the side surface 513 and the second edge area 5121 of the second surface 512. At this time, the elastic rubber head 61 may be deformed too much, so that the effect of transferring the pattern to the second edge area 5121 is not good. In some embodiments, in order to better transfer the pattern to the bending surface of the glass substrate 51 (including the first edge area 5111 of the first surface 511, the side surface 513 and the second edge area 5121 of the second surface 512), when the glass substrate 51 is at the position to be transferred as shown, a first end of the glass substrate 51 where the bending surface is located is closer to the printing substrate 30 than a second end of the glass substrate 51 opposite to the first end. That is, the glass substrate 51 is disposed obliquely with respect to the printing substrate 30, and an oblique angle is, for example, 10 to 60 degrees, as shown in FIG. 8. Compared with the case where the glass substrate 51 is disposed parallel to the printing substrate 30 shown in FIG. 7*a*, with such design, the elastic rubber head 61 may press the printing substrate 30 to cover the first edge area 5111 of the first surface 511, the side surface 513 and the second edge area 5121 of the second surface 512 without being deformed too much, and the pattern may be better transferred to the second edge area 5121 of the second surface 512.

In some embodiments of the present disclosure, the elastic rubber head 61 may have a relatively large deformation, the printing substrate 30 may have good flexibility. Therefore, when the elastic rubber head 61 presses the printing substrate 30, so that the printing substrate 30 covers the first edge area 5111 of the first surface 511 and the side surface 513, and even covers the second edge area 5121 of the second surface 512, the pad printing adhesive layer 33 carrying the pattern on the printing substrate 30 may be attached to the bending surface C of the glass substrate 51 including the first edge area 5111 of the first surface 511, the side surface 513 and the second edge area 5121 of the second surface 512, and the shape of the printing substrate 30 conforms to the shape of the bending surface C of the glass substrate 51. In this way, fineness of the pattern transferred to the glass substrate 51 may be ensured.

Those skilled in the art may understand that, in the process of transferring the pattern on the printing substrate 30 to the bending surface C of the glass substrate 51 through the elastic rubber head 61, that is, in the process of the movement of the elastic rubber head 61 pressing down and returning to the initial position, the release roller 10, the recovery roller 20 and the rollers in the gravure printing device 40 are all in a stationary state, that is, the printing substrate 30 stops transmitting. After the elastic rubber head 61 performs the movement process of pressing down and returning to the initial position one time, the release roller 10, the recovery roller 20 and the rollers in the gravure printing device 40 rotate, the next pattern to be transferred carried on the printing substrate 30 is transmitted to the pattern transfer area 60, and another glass substrate 51 is transmitted to the pattern transfer area 60 for the next alignment and pattern transfer.

Step S70: the pattern carried on the carrier is cured.

Specifically, the curing device 63 is used to cure the pattern carried on the glass substrate 51, the curing device 63 is, for example, a UV curing device, a laser curing device or the like. When the conductive silver paste ink contains a photosensitive resin material, the UV curing device may be selected for UV curing. When the conductive silver paste ink contains a heat-sensitive resin material, the laser curing device may be selected for laser curing. When laser curing is used, a curing time is, for example, 5 to 7 seconds.

In the above embodiment, the pattern is transferred to the printing substrate through gravure printing. Those skilled in the art may understand that, in other embodiments, other methods, such as screen printing, etc., may be used to transfer the pattern to the printing substrate.

Figure 9:
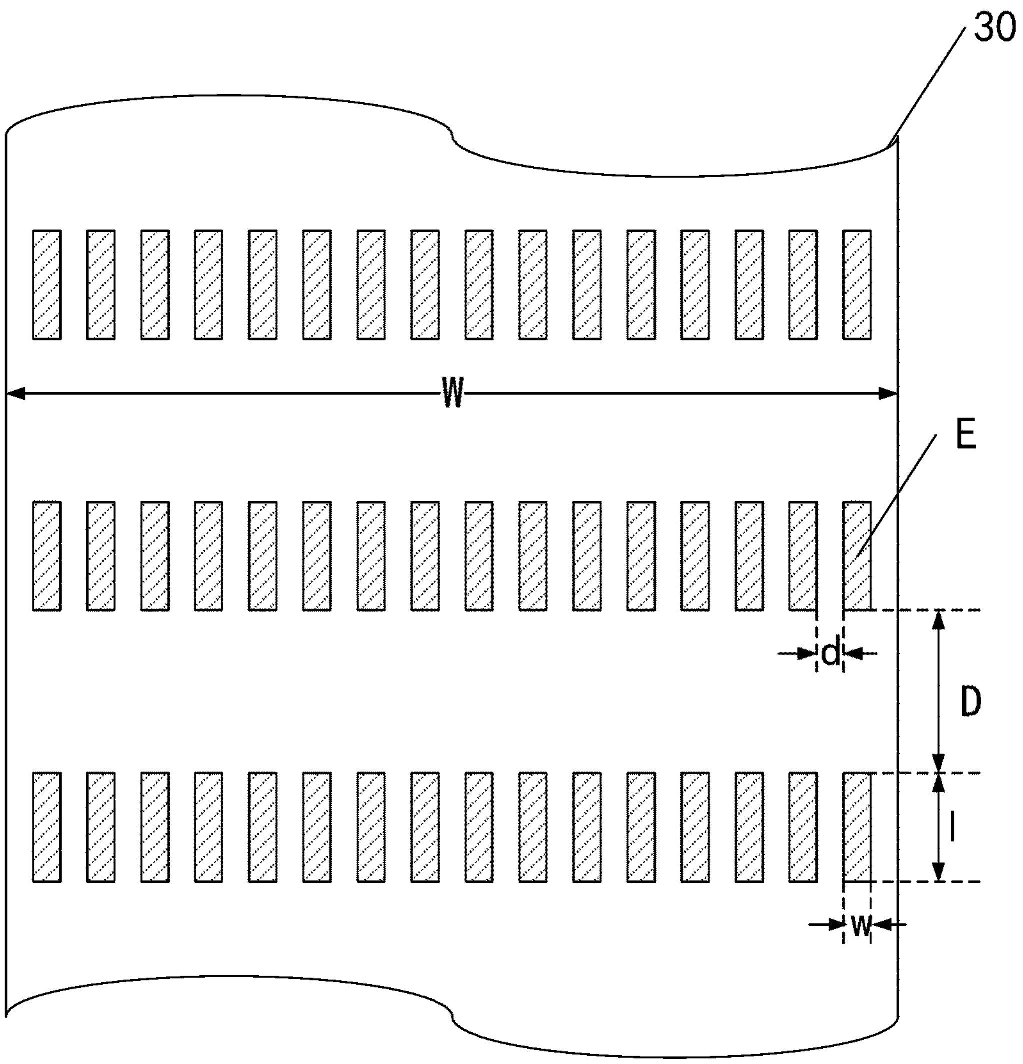
FIG. 9 is a schematic diagram of a pattern to be transferred on a printing substrate according to some embodiments of the present disclosure.

FIG. 9 is a schematic diagram of a pattern to be transferred on a printing substrate according to some embodiments of the present disclosure. As shown in FIG. 9, the printing substrate 30 is provided with a plurality of electrode rows that are spaced apart and parallel to each other, each electrode row is a pattern to be transferred. Each electrode row includes a plurality of electrodes E that are spaced apart and parallel to each other, a length 1 of the electrode E is, for example, 500 μm to 800 μm, a width w of the electrode E is, for example, 60 μm to 100 μm, an interval width d between adjacent electrodes E is, for example, 60 μm to 100 μm, and a thickness of the electrode E is, for example, 10 μm to 20 μm. In one transfer process described in step S60, one electrode row is transferred to the bending surface C of the glass substrate 51. In the next transfer process, another electrode row is transferred to the bending surface C of the other glass substrate 51. A predetermined distance D is spaced between adjacent electrode rows, the predetermined distance D may be set according to actual needs. It is necessary to ensure that during the process of transferring the currently transferred electrode row to the glass substrate 51, neither the elastic rubber head 61 nor the glass substrate 51 will adversely affect the adjacent electrode row to be transferred next time.

The length 1 of the electrode E is greater than the thickness of the glass substrate 51, that is, the length 1 of the electrode E is greater than the width of the side surface 513. After transferring one electrode row to the bending surface of the glass substrate 51, each electrode E in the electrode row extends from the first edge area 5111 of the first surface 511 across the side surface 513 to the second edge area 5121 of the second surface 512, thereby achieving printing of side electrode of the glass substrate 51.

Those skilled in the art may understand that, as shown in FIG. 9, the width W of the printing substrate 30 is substantially equal to the length of the side surface 513 of the glass substrate 51. Thus, the printing of the side electrode of a glass substrate 51 may be completed by one process of transferring.

Although the present disclosure has been described with reference to the drawings, the embodiments disclosed in the drawings are intended to exemplify the embodiments of the present disclosure, and should not be understood as a limitation of the present disclosure. The size ratios in the drawings are only schematic and should not be construed as limiting the present disclosure.

The above-mentioned embodiments only exemplarily illustrate the principles and structures of the present disclosure, and are not used to limit the present disclosure. Those skilled in the art should understand that without departing from the general idea of the present disclosure, any changes and improvements made to the present disclosure are within the scope of the present disclosure. The protection scope of the present disclosure shall be subject to the scope defined by the claims of this present disclosure.

What is claimed is:

1. A pattern transfer method, comprising:

transferring a pattern to a flexible printing substrate; and transferring the pattern on the printing substrate to a bending surface of a rigid carrier through an elastic rubber head, wherein the rigid carrier is a rigid substrate, the bending surface comprises a first edge area of a first surface facing the printing substrate and a side surface adjacent to the first edge area, in response to the rigid substrate being located at a position to be transferred;

wherein the rigid substrate is a glass substrate; and wherein the pattern on the printing substrate is transferred to the bending surface comprising the side surface of the glass substrate.

2. The method of claim 1, wherein in response to transferring the pattern on the printing substrate to the bending surface of the rigid carrier, the elastic rubber head presses the printing substrate, so that a side of the printing substrate carrying the pattern is attached to the bending surface of the carrier, and a shape of the printing substrate conforms to the bending surface of the carrier.

3. The method of claim 1, wherein the bending surface further comprises a second edge area of a second surface, the second surface is opposite to the first surface, and the second edge area is adjacent to the side surface.

4. The method of claim 1, wherein the printing substrate comprises a plastic base layer, an adhesive layer and a pad printing adhesive layer that are sequentially stacked, and the pad printing adhesive layer is configured to carry the pattern to be transferred on the printing substrate.

5. The method of claim 3, further comprising:

polishing at least one of an abutment between the first edge area and the side surface or an abutment between the second edge area and the side surface, so as to achieve a smooth transition.

6. The method of claim 1, wherein the pattern is a conductive pattern, and a material of the pattern is a conductive silver paste ink.

7. The method of claim 1, wherein the printing substrate is continuous, before transferring the pattern to the flexible printing substrate, the printing substrate is released by a release roller, and after transferring the pattern on the printing substrate to the bending surface of the rigid carrier, the printing substrate is recovered and wound on a recovery roller.

8. The method of claim 1, wherein the transferring a pattern to a flexible printing substrate comprises:

transferring the pattern to the flexible printing substrate through gravure printing.

9. The method of claim 8, wherein the transferring the pattern to the flexible printing substrate through gravure printing comprises:

obtaining a pattern material through a plate cylinder and forming the pattern on the plate cylinder;

transferring the pattern on the plate cylinder to a blanket on an offset cylinder roller-to-roller; and transferring the pattern on the blanket to the printing substrate moving between the offset cylinder and an impression cylinder through roller-to-roller rotation of the offset cylinder and the impression cylinder.

10. The method of claim 1, wherein before transferring the pattern on the printing substrate to the bending surface of the rigid carrier through the elastic rubber head, the method further comprises:

transferring the printing substrate carrying the pattern and the carrier to a pattern transfer area, respectively; and positioning and aligning the printing substrate and the carrier.

11. The method of claim 1, wherein after transferring the pattern on the printing substrate to the bending surface of the rigid carrier through the elastic rubber head, the method further comprises:

curing the pattern carried on the carrier.

12. The method of claim 11, wherein the curing the pattern carried on the carrier comprises:

curing the pattern carried on the carrier through UV curing or laser curing.

13. The method of claim 1, wherein before transferring the pattern on the printing substrate to the bending surface of the rigid carrier through the elastic rubber head, the method further comprises:

performing surface treatment on the bending surface of the carrier.

14. The method of claim 13, wherein the surface treatment comprises plasma treatment, chemical grafting, or excimer vacuum ultraviolet irradiation.

15. A pattern transfer apparatus, comprising:

a printing device configured to transfer a pattern to a flexible printing substrate; and an elastic rubber head configured to transfer the pattern on the printing substrate to a bending surface of a rigid carrier, wherein the rigid carrier is a rigid substrate, the bending surface comprises a first edge area of a first surface facing the printing substrate and a side surface adjacent to the first edge area, in response to the rigid substrate being located at a position to be transferred;

wherein the rigid substrate is a glass substrate; and wherein the pattern on the printing substrate is transferred to the bending surface comprising the side surface of the glass substrate.

16. The pattern transfer apparatus of claim 15, wherein the elastic rubber head is configured to press the printing substrate, so that a side of the printing substrate carrying the pattern is attached to the bending surface of the carrier, and a shape of the printing substrate conforms to the bending surface of the carrier.

17. The pattern transfer apparatus of claim 15, wherein the printing device comprises a gravure printing device.

18. The pattern transfer apparatus of claim 15, further comprising:

a release roller configured to release the printing substrate for receiving the pattern; and a recovery roller configured to recover the printing substrate that completes an operation of transferring the pattern to the carrier.

* * * * *